United States Patent
Rose, Jr.

(10) Patent No.: US 9,702,487 B2
(45) Date of Patent: Jul. 11, 2017

(54) RANGE HOOD PIPE GREASE BLOCKAGE PREVENTER

(76) Inventor: Michael A. Rose, Jr., Oakland, NJ (US)

(*) Notice: Subject to any disclaimer, the term of this patent is extended or adjusted under 35 U.S.C. 154(b) by 1635 days.

(21) Appl. No.: 13/018,660

(22) Filed: Feb. 1, 2011

(65) Prior Publication Data

US 2011/0186168 A1     Aug. 4, 2011

Related U.S. Application Data

(60) Provisional application No. 61/337,379, filed on Feb. 3, 2010.

(51) Int. Cl.
*F16L 55/10* (2006.01)
*F16L 9/14* (2006.01)

(52) U.S. Cl.
CPC .............. *F16L 9/14* (2013.01); *F16L 55/10* (2013.01)

(58) Field of Classification Search
CPC .................................. F16L 9/14; F16L 55/10
USPC ............... 138/89, 91, 92, 94, 140, 156, 161
See application file for complete search history.

(56) References Cited

U.S. PATENT DOCUMENTS

| | | | |
|---|---|---|---|
| 182,485 A * | 9/1876 | Saul | 138/143 |
| 1,933,117 A * | 10/1933 | Markle | 285/3 |
| 2,335,906 A * | 12/1943 | Blinn | 52/220.5 |
| 3,191,632 A * | 6/1965 | Keiding | 138/151 |
| 4,369,813 A * | 1/1983 | Thomas | 138/94 |
| 4,506,655 A | 3/1985 | Kuechler | |
| 4,715,841 A * | 12/1987 | Nelson et al. | 446/222 |
| 5,676,174 A | 10/1997 | Berneski, Jr. et al. | |
| 5,927,340 A * | 7/1999 | Barton | 138/92 |
| 6,182,559 B1 | 2/2001 | Chiang | |
| 6,449,865 B1 * | 9/2002 | Heckman | 33/726 |
| 7,137,308 B2 | 11/2006 | Harris | |
| 2005/0165416 A1 * | 7/2005 | Bojarski et al. | 606/144 |
| 2009/0172945 A1 | 7/2009 | Grillo | |

FOREIGN PATENT DOCUMENTS

EP          0 091 004          3/1983

* cited by examiner

*Primary Examiner* — Vishal Pancholi
(74) *Attorney, Agent, or Firm* — Gearhart Law LLC

(57) ABSTRACT

A debris blocking device that may prevent grease and particular buildup inside the protective piping of a typical fusible link fire detection system. The debris blocking device has a shield with two surfaces. The one surface engages a protected object, while the other surface forms an area of the shield. The debris blocking device has an opening disposed within the area of the shield. The debris blocking device may engage a length of conduit, or piping that has an inside and an outside surface, and an open end. One surface of the debris blocking engages the inside surface of the open end of the conduit or pipe. This surface of the debris blocking device may also contain the opening that is capable of admitting an elongated component.

15 Claims, 2 Drawing Sheets

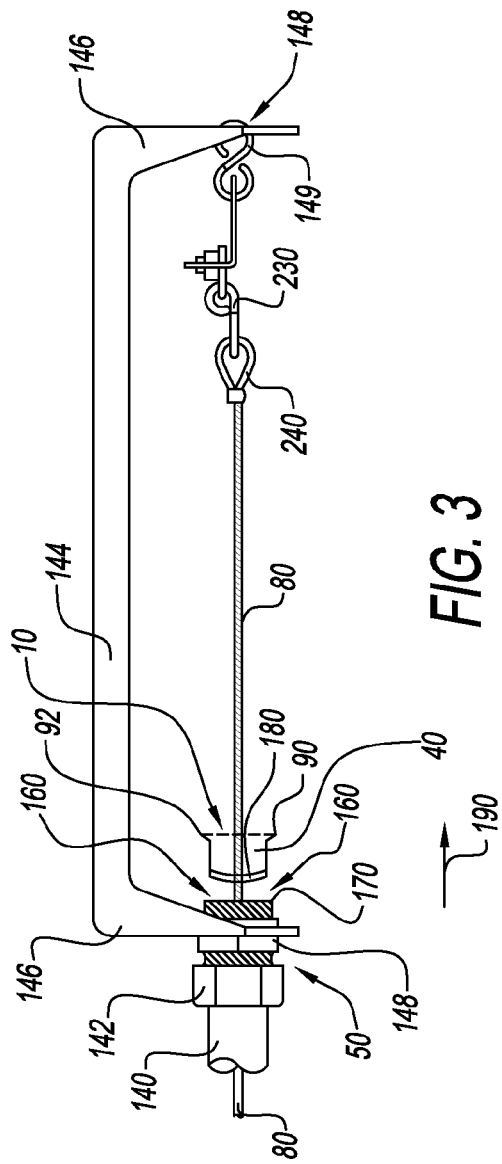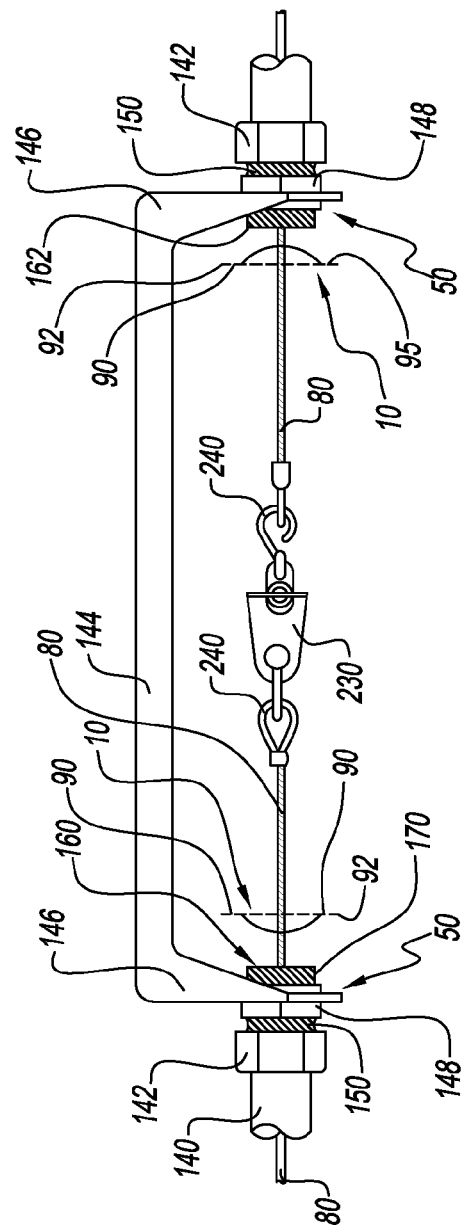

RANGE HOOD PIPE GREASE BLOCKAGE PREVENTER

CLAIM OF PRIORITY

This application claims priority to U.S. Ser. No. 61/337,379 filed Feb. 3, 2010, the contents of which are fully incorporated herein by reference.

FIELD OF THE INVENTION

The invention relates to range hood fire suppression systems, and more particularly to a protective device for reducing the amount of grease laden vapors that enter into the detection line pipe shield of such systems.

BACKGROUND OF THE INVENTION

The invention relates to a device capable of protecting the interior of ducts, pipes or conduits from vapor borne oils, grease and other particulate matter that may otherwise enter them via the openings at their end. The device preferably contains a reservoir for collecting particulate matter and an opening for admitting a wire or a cable into the piping. The wire or a cable is free to move in and out of the opening at all times.

In a preferred embodiment, the present invention may be used with the fusible link, fire detection units typically found in range hood suppression systems. Such fusible link detection systems are typically installed at strategic locations within the hood or duct assemblies of commercial kitchens and serve as fire safety measure that is typically a requirement of building codes. These fusible link detection systems are usually installed above the kitchen appliances and under the exhaust duct openings.

A fusible link detection system typically consists of a length of taut cable, one end of which is connected to a suppression system control head, with the other end fixed to a manually releasable activation switch. The term "fusible link" refers to one or more sections of the cable that are designed to melt when the temperature inside the ductwork, or the range hood exhaust system, reaches or exceeds a critical level that may be indicative of an out of control fire in the range. When the fusible link melts, the cable or wire may slacken, causing the control head to release a fire suppression agent through the system. In a typical fusible link detection system, the cables are protected by piping, with only the fusible link sections being exposed directly to the cooking fumes being vented by the range hood.

However, some of the cooking fumes may enter the protective piping surrounding the cable. These fumes typically carry oil, grease and flammable particulate matter. Over time this oil and grease may accumulate on the inside of the pipes, on the cable and on the pulleys that guide the cable around bends in the pipe work. This buildup of oil and grease is not only a fire hazard, but may rust the pipes from the inside and may also jam the corner pulleys. The buildup of residue on the cable and on the pulley may prevent the cable from slacking even if the fusible links melt so that the fire suppression agent is not released even in the event of an out of control fire.

Because of these hazards, fire safety codes typically require that the range hood fire suppression systems and their hoods and ducts be inspected regularly. However, even if a dangerous buildup is detected, the residue is difficult to remove. The proper method would be to remove and replace the protection pipe work. This may be a costly undertaking as it typically requires the restaurants to close for the duration of the work is being performed.

The present invention is intended to prevent grease and particular buildup inside the piping and make fire suppression systems more reliable. The device contains an opening to admit the cable used in the fusible link system. There may be filtered openings for fumes as well. Alternatively, the device may simply shield an opening or a duct from grease like buildup without having an opening for a fuse link cable.

Additionally, the present invention offers a collecting or settling surface for the congealing agents. Therefore, rather than settling back down onto the cooking surfaces the rejected particles are removed from the kitchen all together when the component is replaced by the certified technician; it may be removed from the area and discarded appropriately. In this way, a critical grease buildup is easy to detect if maintenance is not performed since it is likely visible from the outside and the problem is easily rectified by either removing the residue from the outside surface of the present invention or by replacing the cover entirely. The relative simplicity of the device and the labor involved will significantly reduce the time and expense involved with effectuating the required maintenance.

DESCRIPTION OF THE RELATED ART

U.S. Pat. No. 5,676,174 discloses a diameter plug for sealing the open end of a pipe. The plug is capable of being reused on a range of pipe outer diameter tolerances and of providing effective fluid-tight sealing over a range of internal pressures. The plug is particularly suited for use in pressure testing pipes by means of pressure fluids admitted to the pipes through the plug.

U.S. Pat. No. 7,137,308 discloses a sliding pipe plug for working on and testing pipes is presented. The sliding pipe plug includes a center portion and a gasket disposed about the central portion. When towed through the pipe, the sliding pipe plug maintains a substantial seal against water flowing through the pipe. In some embodiments, a flexible gasket can be utilized to allow for substantial sealing while the sliding pipe plug is traversing obstacles in the pipe. The sliding pipe plug according to the present invention can be utilized in pipes where conventional plugs are inconvenient. For example, in FELL testing a sewage line, a sliding pipe plug can be attached to a sonde cable and the testing can proceed without plugging and surcharging all of the section of pipe to be tested. In some embodiments, the sliding pipe plug includes a break-away section that allows the seal against water flowing through the pipe to be broken when the sliding pipe plug is pulled in a direction opposite the towing direction. In some embodiments, the sliding pipe plug includes a centering section that keeps the sliding pipe plug essentially in the center of the pipe.

Various implements are known in the art, but fail to address all of the problems solved by the invention described herein. One embodiment of this invention is illustrated in the accompanying drawings and will be described in more detail herein below.

SUMMARY OF THE INVENTION

The present invention discloses a debris blocking device that may prevent grease and particular buildup inside the piping of a typical fusible link detection system.

In a preferred embodiment, the debris blocking device has a shield with two surfaces. The one surface may engage a protected object, while the other surface may form an area of the shield. The debris blocking device preferably has at least one opening disposed within the area of the shield. The debris blocking device may engage a length of conduit or piping that typically has an inside and an outside surface, and an open end. One surface of the debris blocking may engage the inside surface of the open end of the conduit or pipe. This surface of the debris blocking device may also contain at least one opening that is capable of admitting an elongated component.

Therefore, the present invention succeeds in conferring the following, and others not mentioned, desirable and useful benefits and objectives.

It is an object of the present invention to provide shielding against the entry of grease.

It is another object of the present invention to provide an accumulation surface for particular matter within exhaust vapor.

Yet another object of the present invention is to provide an entry aperture for a fusible link cable.

Still another object of the present invention is to provide for a grease blocking device that contributes to a safer exhaust system.

Still another object of the present invention is to provide a grease blocking device that works in conjunction with existing fusible link technology.

Yet another object of the present invention is to provide a blocking device that is capable of capturing, yet excluding undesirable substances inside apertures.

Still another object of the present invention is to provide a debris blocking device that is capable of being fitted into multiple sized pipes, conduits or other apertures.

BRIEF DESCRIPTION OF THE DRAWINGS

FIG. 3 shows a side view of a fusible link assembly, utilizing a preferred embodiment of the present invention.

FIG. 4 shows a side view of an alternate fusible link assembly, utilizing another embodiment of the present invention.

DESCRIPTION OF THE PREFERRED EMBODIMENTS

Figure 1:
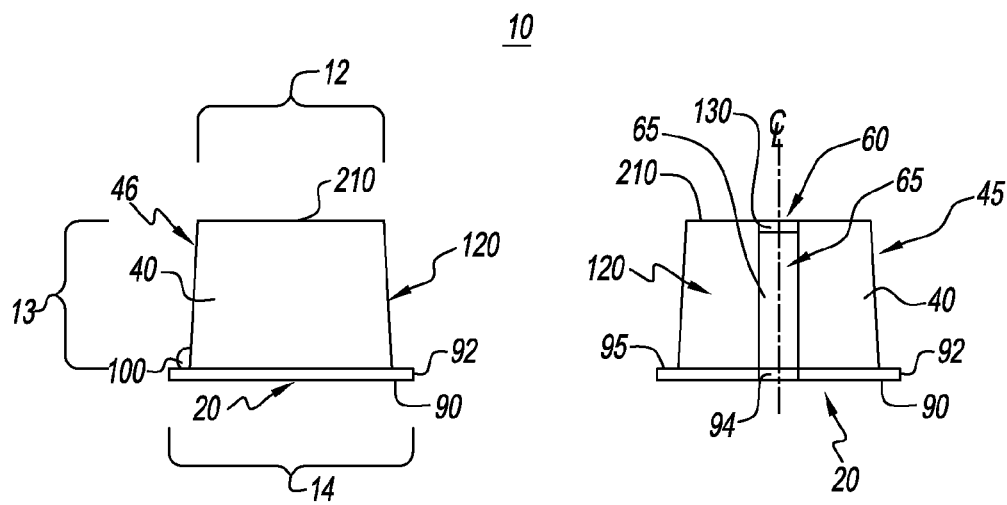
FIG. 1 shows two, opposite side views of the preferred embodiment of the present invention.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 discloses a side view of the present invention. Shown are a debris blocking device 10 (device), the shield 20, a first surface 40, at least one opening 60, an installation gap 65, a lid flange 90, an outer edge 92, an inner edge 94, an angle 100, an outer surface 120, an edge of the opening 130. The preferred embodiment is a device where the first surface 40 is formed from a sidewall 45 and a bottom wall 210. However, other embodiments are possible, such as, but not limited to a convex, concave, or conical shape for the entire second surface 30 or first surface 40, which may be the opposites of each other. This may be appropriate since the second surface 30 is the inverse side of the first surface 40, unless the sidewall 45 contains a substantial thickness, such that the second surface 30 contains an arc of a different radian value that the first surface 40.

The bottom wall 210 and the lid flange 90 are preferably circular, since a majority of apertures, including the aperture for the preferred use, are circular or elliptical. The bottom wall forms a bottom surface with respect to the inner surface 110. However a square, triangular or any other appropriate shape may be utilized. The preferred height 13 of the debris blocking device is between 1 and 3 inches. The width or diameter 12 of the bottom wall 210 is preferably less than the width or the diameter 14 of the lid flange 90. The width or diameter of the lid flange 90 may be the distance between opposite points on the inner edge 94. There is no preferable distance between the inner edge 94 and the outer edge 92. The preferred width 12 is between 1 inch and 6 inches, and the preferred width 13 is between 2 inches and 12 inches. However, the dimensions of the device 10 are very much dictated by the dimensions for fusible link conduits 140 (FIGS. 3 and 4). The fusible link conduits 140 are the preferred protected object for the present invention, although other protected objects are possible. The width of 12 and 14 is preferably only a fraction smaller than the width or diameter of the open ends 180 (FIGS. 3 & 4). The lid flange 90 meets the first surface 40 or the second surface 30 at an angle, which is preferably perpendicular, but may be more acute or obtuse.

The outer surface 120 may preferably frictionally engage the inside surface 160 of a conduit 140 (FIG. 3). However, the engagement may be enhanced, or made more hermetic by using frictional surfaces, a threaded association, or at least one notch and groove combination, or at least one tab and catch combination. The notches, grooves, tabs or catches, as well as any frictional elements may be disposed either entirely on the device 10, or on the inside surface 160 or on both devices as a male-female combination.

The lid flange 90 is designed to prevent further insertion of the device 10 into an aperture or opening 180. This is desirable to prevent situation where the device 10 has been inserted too deep into an opening 180, making any subsequent removal very difficult or impossible. To prevent such outcome, the inner brim 95 of the lid flange 90 preferably abuts a rim 182 of an opening 180 or a rim of any other aperture utilizing the present invention. Therefore, a removal of the device 10 may be effectuated by engaging the lid flange 90, by either prying the lid flange away from the rim 182 by hand or with a tool, or by twisting the device 10 if the first surface 40 and the inside surface 160 of a conduit 140 are threadedly mated with each other.

It is preferable that the present invention is made out of durable, heat resistant material, which may include metals, plastics, or any composites of such materials. Other useful materials from which to manufacture any of the components of this invention include one or more plastics and resins, including but not limited to plastic, rubber, foam, silicone, ABS, Polycarbonate, Noryl™, PVC, Polystyrene, ABS/PVC, PVC/Acrylic, Polysulfone, Acrylic, Polyethylene, Kydex™, PETG; glass, including but not limited to fiberglass, borosilicate, or quartz; wood; metals, including but not limited to iron, tin, aluminum, copper; rubber including but not limited to natural rubber, SBR, Isoprene rubber, Butadiene rubber, and Chloroprene rubber; or any combinations or composites of these materials or other materials and new materials that may be manufactured in the future.

The various parts or sections of the present invention may be manufactured from identical or different materials, combinations of materials, or composites of materials.

Figure 2:
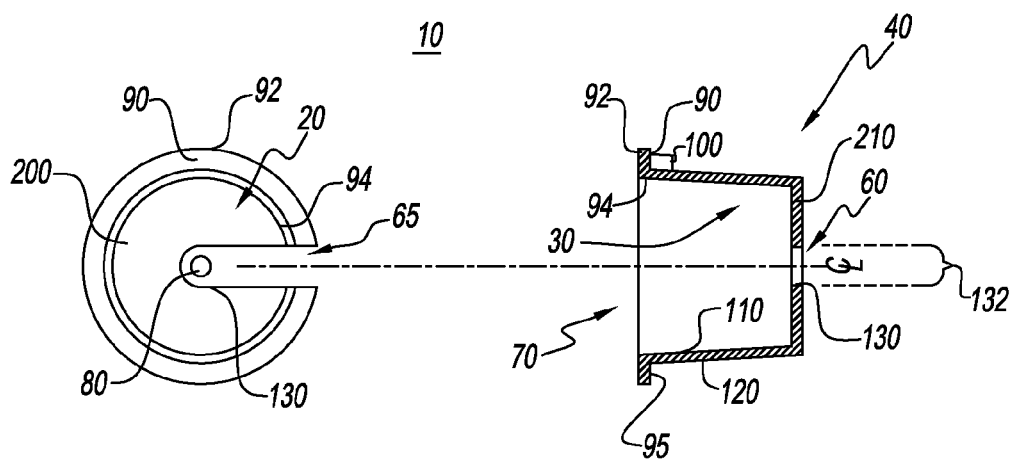
FIG. 2 shows a front view and a sectional view of the present invention.

FIG. 2 is a front view and a cut away side view of the present invention. Shown are a debris blocking device 10, a shield 20, a first surface 30, a first surface 40, at least one opening 60, an installation gap 65, an area of said first surface 70, an elongated component 80, a lid flange 90, an outer edge 92, an inner edge 94, an inner brim 95, an angle 100, an inner surface 110, an outer surface 120, an edge of the opening 130, and a bottom wall 210.

The second surface 30 represents the inner surface 110 that constitutes the shield 20. The second surface 30 is exposed to the inflow of fumes and vapor, therefore, the entire area 70 of the shield 20 functions as a settlement plane, to receive and retain any particular matter present within the incoming fumes. The particular matter settles on the inside surface 110, which may or may not be coated with an attracting agent, which may be a chemical agent or a porous, grease attracting surface. The primary function of the present invention is to prevent grease from entering the opening that is protected by the device 10, and not to serve as a filter to attract and retain particular matter. However, it is inevitable that some of the grease and particular waste will be attracted to the conduit 140 and the device 10 may then be used to prevent these solids from entering further into the conduit 140 to settling anywhere else within the exhaust system.

The opening 60 permits an entry for an elongated member 80, which in the preferred embodiment, is a fusible link wire or cable 80. The width of the opening 60 is substantially dictated by the specification or code requirements that may specify the required diameter range for the cable 80, or may preferably be between ⅛ of an inch and 2 inches in diameter. The preferred embodiment contains one opening 60. Alternatively, there may be two or more openings of same or similar sizes. The elongated element 80, which may be a wire or cable, is inserted into the opening 60, and remains in a tight association therewith, to guard against grease entering the protected cavity, which in the preferred application is the inside of the length of conduit 140. The tight association still allows for a small gap between the edge of the opening 130 and the cable 80, to permit a free motion of the cable 80, if a fusible link 230 (FIG. 3) is activated.

The edge of the opening 130 may completely surround the elongated member 80 and thus prevent any grease from seeping through the opening 60. The opening 130 may have soft or substantially hard and/or sharp elements that may scrape off any accumulated grease from the elongated member 80. The scrapping off will be take place if the fusible link 230 is suddenly triggered, forcing the cable 80 to retract. Without the present invention, accumulated grease may gum up, congeal or solidify about the cable 80, thus reducing the potentially required lateral motion of the cable 80 within a conduit 140, in the event that the fusible link 230 fails. This would substantially undermine the fire readiness of the fusible link system. The scrapping elements on the edge 130, would additionally remove any debris from the cable 80 during activation of the fusible link 230.

The installation gap 65 enables for replacement of the device 10, without impacting the cable 80, or requiring the device 10 to be modified or destroyed in the process. The device 10 may be installed over an existing fusible link cable 80 by inserting it through the installation gap 65, until an opening 60 is reached. The installation gap 65 additionally provides a squeezable crease for the present invention. The squeezable crease or a fold plane comes into play when the device 10 is installed into an opening 180 having a substantially smaller diameter than the width 14. For example, the bottom wall 210 would preferably be inserted into an aperture 180 with little or no further effort, since the width 12 may be smaller than the width or diameter of an aperture or opening 180. As the device is inserted further into the aperture 180, the distance between to opposite points on the sidewall 45 increases until the maximum distance or width 14 is reached, which is preferably as wide, or wider than the width of the aperture 180. From that point on the width or diameter 14 of the device 10 must be decreased to fully the first surface 40 within the aperture 180, until the rim 182 (FIG. 3) reaches the inner brim 95. The installation gap 65 provides the ability to decrease the width of widths 12 and 14. Alternatively, the widths 12 and 14 may be varied by having multiple slots within the sidewall 45 that are capable of squeezing shut under pressure and opening when pressure is removed. Such a stress crease as the installation gap 65 or alternative embodiments of the functionality enable the device 10 to fit within apertures that are slightly or substantially narrower than the opening 180. The preferred width or diameter 12 or 14 of the device 10 may be between 0.5 and 8 inches. The preferred width 13 may be between 0.5 and 3 inches. The device 10 may be adjusted to fit very large pipes, conduits or apertures by using external rings (not shown), which would fit around the outer surface 120. Alternatively the installation gap 65 may have fray-able or break-away edges that may widen the installation gap 65 to adjust its diameter 12 or 14 to a substantially smaller pipe, conduit or aperture.

The installation gap 65 may be sealable with a ring or a second surface that is attached to the inner surface 110 or outer surface 120. Alternatively the installation gap 65 may be sealed with a flap or an insert. The area 70 may be made of a netted semi-permeable material, that may be easily deformed, but which is capable of trapping the grease and other particular matter that may be attracted to the opening 180. Alternatively the entire portion of the second surface 30 may contain a flap, which would entirely cover all open space surrounding the elongated component 80. In another alternative, the second surface 30, or a part of the area 70, or just a flap within the second surface 30, may be made from a fray-able material, which may be capable of disintegrating or tearing during a fusible link activation event that leads to a retraction or extension of the elongated component 80. The bottom wall 210 may not have any opening, but may be made of a thin material, which may be fully deformable or penetrable. Such a thin bottom wall 200 may form the entire device 10. The thin material may be cut, frayed or chiseled to form an appropriate diameter and the installation gap 65 or an opening 60 may be easily created with a sharp tool or by hand. However, such thin material would still preferably be substantially stiff and elastic as to form an effective and durable blocking device.

The preferred embodiment is a substantially one-size-fits-all device. The one-size-fits-all property of the present invention may be further expanded in an alternative embodiment. For example, the bottom wall 210 may be a diaphragm shutter that may include individual overlapping leaves. Moving such leaves apart would reveal an opening for the elongated element 80. Some of the leaves may be capable of moving apart completely so as to form an installation gap 65. Furthermore moving the leaves apart would serve to increase the area 70 and thus the covered diameter of a conduit, pipe or aperture that would utilize this embodiment of the device 10. Similarly moving the leaves closer together would reduce the width 12 or 14 of the device 10 so that it may cover a smaller pipe, conduit or aperture. This embodiment may be utilized with or without the second surface 40. Without the second surface 40, the leaves may also form the lid flange 90 with the outer edge 92 frictionally abutting the inside surface 160 of a conduit 140, or with the outer edge 92 engaging a groove or a thread on the inside surface 160. The first surface 40, if present, may also have leaves that expand and contract in concert with the leaves of the first surface leaves 30. The diaphragm shutter embodiment may be spring loaded with a bias toward full expansion or it may be mechanically or fictionally held to a particular diameter.

The debris blocking device 10 is preferably shaped in a way that makes its installation easy and removal more difficult. For this reason the bottom wall 210 enters the opening 180 with relative ease. However, the sidewall 45 flares outward to meet the inner edge 94 of the lid flange 90. Thus at some point along the width of the sidewall 45, the first surface 40 engages the inner surface 160 of a conduit 140, or any other aperture (not shown). The distance between this point of engagement and the inner brim 95 is traversed with considerable outside force. At this point, an onlooker would adjudge the present invention as being forced into the opening 180. Such forcing is made possible by squeezing the installation gap 65 towards a closed position. Alternatively the inner brim 95 may be bordered by a grove on the outer surface 120 that may snap into the opening 180, thus obviating the need for any substantial sidewall 45, or the sidewall 45 and the inner surface 160 may be mated in a continuous engagement, which would mean that the width 12 and the width 14 are substantially equal, but slightly less than the width or diameter of the opening 180.

FIGS. 3 and 4 indicate the preferred use for the present invention, although multiple other uses, either listed or omitted, may be feasible. FIG. 3 displays the preferred embodiment of the present invention. Also shown are a debris blocking device 10, a shield 20, a second surface 30, a first surface 40, a protected object 50, an area of said second surface 70, an elongated component 80, a lid flange 90, an outer edge 92, an inner brim 95, an angle 100, a shielded conduit 140, a mounting nut 142, a fusible link bracket 144, a fusible link bracket arms 146, a bracket opening 148, a terminus loop 149, an extension 150, an inside surface 160, an outside surface 170, an open end 180, a rim 182, a bottom wall 210, a fusible link 230, and a loop connector 240.

The fusible link assembly is usually made up of a fusible link bracket 144, having two bracket arms 146. The bracket arms 146 contain bracket openings 148 to mount the shielded conduit 140. The shielded term is premised on the fact that the device 10 covers the open end 180. Otherwise any generic conduit 140 may be benefitted by the present invention, included in a list of potential uses are other types of apertures that require this kind of protection. In FIGS. 3 and 4, the conduit 140 terminates at the mounting nut 142. An extension 150 is then mounted within the bracket opening 148. The exterior surface of the extension 150 typically contains threading for attaching to the mounting nut 142 and for accepting the bracket opening 148. The fusible link bracket 144 usually accepts the conduit 140 on one end only, with the other end supporting a terminus loop 149. However, some embodiments may have a conduit 148 on either end of the fusible link bracket 144.

The fusible link 230 is made of material having a relatively low melting point that is designed to melt when the temperature of the surrounding air reaches a particular temperature. The elongated element 80, which is typically a length of cable that is usually metallic, is tightly stretched between the loop connector 240 on the fusible link 230 and a release spring (not shown). The release spring is connected to an actuator capable of discharging a fire retarding chemical. If the fusible link 230 melts and breaks, the spring at the other end of the cable 80 will contract, causing a release mechanism (not shown) to discharge a fire repelling chemical mixture into the exhaust ductwork, or into the general cooking area. Therefore, it is critical that the cable 80 is able to laterally move within the conduit 140 and the grease on the cable 80 would tend to prevent this.

The device 10 is shown slightly separated from the open end 180. The device 10 may be inserted over the cable 80 using the installation gap 65. Thereafter the cable 80 would be disposed within the opening 60. The device 10 is inserted into the conduit 180 with the bottom wall 210 or the general first surface 40 being in the lead and engaging the inside surface 160 of the open end 180. The lid flange is capable of retaining the device 10 at the rim 182 of the opening 180, even if the fixable link 230 activates and the cable 80 is pulled back. FIG. 3 shows the preferred embodiment, while the FIG. 4 displays another preferred embodiment, with the first surface 40 being substantially convex as to create a larger area 70 to receive particular matter. The convex shape or a cup shape is not strictly necessary and the embodiment may consist of just the lid flange 90, some portion of the first surface 40 to engage the open end 180, and an opening 60. In another alternative, a sealing means may be provided to close up the installation cap 65. The sealing means may be an insert that may be adhere to the inner surface 110 or the outer surface 120. The sealing means may be movably attached to the first or second surfaces 110 or 120 as a second surface, such that the installation gap 65 may be opened for installation and then closed by rotating this second surface over the installation gap 65. The present invention may have many other uses and applications. Some of the uses and applications may have been clearly expressed herein, extrapolated from the present disclosure or omitted. The debris blocking device 10 shown in FIG. 1 and FIG. 2 may be considered to be a conical frustum surface 400 having an open wide end and a closed narrow end. The conical frustum surface 400 may have a rim attached to the wide end. The attached rim may extend perpendicularly to, and way from, the conical frustum surface's axis of rotation. The circular hole may be machined through the closed narrow end and may be centered on the conical frustum surface's axis of rotation. There may also be a slot machined through the conical frustum surface 400. The slot may extend outward from the circular hole through and along the closed narrow end and then along the side surface of the conical frustum surface 400 to the wide end, remaining aligned with the axis of rotation along.

The debris blocking device 10 may be made of a material having a suitable spring to it, such as, but not limited to, an appropriate alloy of steel, aluminum, brass, bronze and a PVC plastic or some combination thereof.

As described above, the debris blocking device 10 is preferably sized to be able to squeezably fit inside a hood range detection line shielding pipe. Such a size may need to be adjusted to fit variously sided hood range detection line shielding pipes made by different manufacturers, but is generally may have a diameter in a range of 1.5 inches to 4 inches, and more often in a range of between 2 and 3 inches in diameter.

In order for the debris blocking device to function most effectively, the circular hole may be sized such that, when said device is fitted in a hood range detection shielding pipe, the effective diameter of the circular hole slightly larger than the diameter of the hood range detector's fusable link cable. In a preferred embodiment, the circular hole may be squeezed down to have a diameter that is in the range of 1-10% larger than the cable of the fusable link of the range hood to which the device is attached.

In a further, more preferred embodiment, the circular hole is sized such that, when the device is fitted in a hood range detection shielding pipe, the diameter of the circular hole is in a range of 2-5% larger than a diameter of the diameter of a cable of a fusable link of a hood range detector to which said device is fitted.

In a preferred embodiment, slot may be sized and shaped such that, when said device is fitted in a hood range detection shielding pipe, the portion of the slot extending along the narrow closed end of the conical frustum is squeezed down to be substantially closed except for the circular hole.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A shielded kitchen range conduit comprising:
    a length of kitchen range conduit having an inside surface, an outside surface, and an open end; and
    a debris blocking device in the shape of a conical frustum having a first surface, and a second surface, and at least one opening,
    wherein said first surface engages said inside surface of said length of kitchen range conduit;
    wherein said at least one opening is capable of admitting an elongated component.

2. The shielded kitchen range conduit of claim 1, wherein said debris blocking device further comprises a lid flange, said lid flange engaging said first surface and said second surface at an angle.

3. The shielded kitchen range conduit of claim 1, wherein said first surface and said second surface form a wall of a container;
    said container further comprises a bottom wall;
    said bottom wall or said wall of said container having at least one opening; and
    said opening being in a tight association with said elongated component.

4. A debris blocking device comprising:
    a frustoconical shaped device having an outer surface, an inner surface and a bottom surface,
    wherein said outer surface is configured to engage an inner surface of a length of kitchen range conduit; and
    at least one opening, said opening within said bottom surface or said inner surface.

5. The debris blocking device of claim 4, further comprising an elongated member, said elongated member being inserted through said opening.

6. The debris blocking device of claim 4, further comprising a lid flange said lid flange engaging said outer surface and said inner surface at an angle.

7. The debris blocking device of claim 4, wherein said first surface contains a thread, said thread engaging a cooperating thread on said protected object.

8. The debris blocking device of claim 4 wherein said first surface contains frictional elements.

9. The debris blocking device of claim 4, wherein an edge of said opening further comprises a scraping element, said scraping element capable of scraping debris off said elongated component.

10. A debris blocking device, consisting of:
    a conical frustum having an open wide end and a closed narrow end;
    a rim attached to the wide end of said conical frustum, said rim extending perpendicularly to an axis of rotation of said frustum and away from said axis of rotation;
    a substantially circular hole through said closed narrow end, said hole aligned to be substantially centered on said axis of rotation; and
    a slot extending outward from said hole through said closed narrow end, along said closed narrow end to a side of said frustum, and then extending along a side surface of said frustum to said wide end, aligned with said axis of rotation.

11. The device of claim 10 comprising a spring material selected from the group comprising steel, aluminum, brass and PVC plastic.

12. The device of claim 10 sized to squeezably fit inside a hood range detection line shielding pipe.

13. The device of claim 10 wherein said substantially circular hole is sized such that, when said device is fitted in a hood range detection shielding pipe, a diameter of said substantially circular hole is a range of 1-10% larger than a diameter of the diameter of a cable of a fusible link of a hood range detector to which said device is fitted.

14. The device of claim 10 wherein said substantially circular hole is sized such that, when said device is fitted in a hood range detection shielding pipe, a diameter of said substantially circular hole is a range of 2-5% larger than a diameter of the diameter of a cable of a fusible link of a hood range detector to which said device is fitted.

15. The device of claim 10 wherein said slot is sized and shaped such that, when said device is fitted in a hood range detection shielding pipe, the portion of the slot extending along the narrow closed end of the conical frustum is squeezed down to be substantially closed except for the substantially circular hole.

* * * * *